United States Patent
Peuchert et al.

(10) Patent No.: US 6,680,266 B1
(45) Date of Patent: Jan. 20, 2004

(54) ALKALINE-EARTH ALUMINOBOROSILICATE GLASS AND THE USES THEREOF

(75) Inventors: Ulrich Peuchert, Mainz (DE); Peter Brix, Mainz (DE); Andreas Hübner, Heidesheim (DE)

(73) Assignee: Schott Glas, Mainz (DE)

( * ) Notice: Subject to any disclaimer, the term of this patent is extended or adjusted under 35 U.S.C. 154(b) by 0 days.

(21) Appl. No.: 10/070,159

(22) PCT Filed: Sep. 2, 2000

(86) PCT No.: PCT/EP00/08602
§ 371 (c)(1),
(2), (4) Date: Jun. 14, 2002

(87) PCT Pub. No.: WO01/17921
PCT Pub. Date: Mar. 15, 2001

(30) Foreign Application Priority Data

Sep. 4, 1999 (DE) .......................... 199 42 259

(51) Int. Cl.$^7$ .................. C03C 3/091; C03C 3/095; C03C 3/093
(52) U.S. Cl. ...................... 501/66; 501/64; 501/67; 501/69; 501/70; 313/636
(58) Field of Search .................. 501/66, 67, 69, 501/70, 64; 313/636

(56) References Cited

FOREIGN PATENT DOCUMENTS

| | | |
|---|---|---|
| EP | 0510544 | 10/1992 |
| JP | 61295256 | 12/1986 |
| JP | 9012333 | 1/1997 |
| JP | 09255354 A | * 9/1997 ........... C03C/3/085 |

OTHER PUBLICATIONS

Machine Translation of JP 9–255354, Nishizawa et al.*
XP002155623 Abstract (AGTechnology KK), Jan. 14, 1997.
Patent Abstract of Japan vol. 0ll, No. 167 (C–425), May 28, 1987–JP 61 295256 (Ohara Inc).

* cited by examiner

Primary Examiner—David Sample
Assistant Examiner—Elizabeth Bolden
(74) Attorney, Agent, or Firm—Millen, White, Zelano, Branigan, P.C.

(57) ABSTRACT

The invention relates to low-alkali or alkali-free alkaline-earth aluminoborosilicate glasses of the following composition (in wt.-% on an oxide basis) $SiO_2$>49–65; $B_2O_3$ 0.5–4.5; $Al_2O_3$>10–23; MgO>2.7–7; CaO 0.5–10; SrO>15–22; BaO 0.5–7; provided that MgO+CaO+SrO+BaO>20–35; $SnO_2$ 0–2; $ZrO_2$ 0–2; $ZrO_2$ 0–2; $TiO_2$ 0–2; $CeO_2$ 0–1.5; ZnO 0–1; $Na_2O$ 0–2; $K_2O$ 0–2; provided that $Na_2O+K_2O$ equals 0–3. The inventive glasses are especially suitable for use as substrates in thin film photovoltaic technology and as glasses for bulbs.

25 Claims, No Drawings

ALKALINE-EARTH ALUMINOBOROSILICATE GLASS AND THE USES THEREOF

The invention relates to aluminoborosilicate glasses which contain alkaline earth metals. The invention also relates to uses of these glasses.

When energy is being obtained by means of photovoltaics, the property of certain semiconducting materials of absorbing light from the visible spectral region as well as the near UV or IR to form free charge carriers (electron/hole pairs) is utilized. If there is an internal electric field in the solar cell, produced by a pn junction in the photoactive semiconductor material, these pairs can be spatially separated using the diode principle, leading to a potential difference and, given suitable contacts, to the flow of current. Solar cell systems which are currently commercially available contain, as photoactive material, almost exclusively crystalline silicon. This is produced as what is known as "solar grade Si", inter alia, as a waste material during the production of high-purity silicon single crystals for complex integrated components (chips).

The possible applications for photovoltaic installations can be roughly divided into two groups. These are, firstly, applications which are not connected to the mains, which are used in remote areas on account of the lack of energy sources which are relatively easy to install. By contrast, solutions which are connected to the mains and in which solar energy is fed into an existing fixed mains remain uneconomical, on account of the high cost of solar current, and are therefore relatively rare.

Therefore, the future market development of photovoltaics, in particular for solutions which are connected to the mains, is highly dependent on the potential for reducing costs in the production of solar cells. The implementation of thin-film concepts is considered to offer great potential. In this case, photoactive semiconductor materials, in particular highly absorbent compound semiconductors, are deposited in layers which are a few $\mu$m thick on substrates which are as inexpensive as possible and are able to withstand high temperatures, for example glass. The possibilities for reducing costs lie primarily in the low consumption of semiconductor material and the excellent possibilities for automation during the production compared to wafer Si solar cell production.

Solar cells based on the II–VI compound semiconductor CdTe are a promising thin-film concept. This material satisfies essential conditions, such as a band gap which is well matched to the solar spectrum, high absorption of the incident light and very good chemical stability of the compound.

The same is true of the compound semiconductor Cu(In, Ga) (S,Se)$_2$, ("CIS"). Compared to the first example, this is also more environmentally friendly, since it does not contain any Cd.

Thin polycrystalline films of CdTe can be produced by a range of methods (vapor deposition, screen printing, sublimation, spray pyrolysis, electrodeposition), but only in p-conducting form. To obtain a pn junction, what is known as a heterojunction has to be produced using a different n-conducting material, e.g. CdS.

In addition to the substrate technologies which are in widespread use in thin-film photovoltaics (semiconductor resting on bases made from materials such as glass, metal, plastic, ceramic), having said layers and a covering glass, with the light acting through the covering glass, a superstrate arrangement has also established itself in particular in CdTe photovoltaics. In this arrangement, the light from impingement on the semiconductor layer initially passes through the support material. This eliminates the need for the covering glass, which has advantages in terms of costs. To achieve high efficiencies, it is necessary for substrates of this type to have a high transparency in the VIS/UV region of the electromagnetic spectrum, which makes the use of glass a suitable solution. For example, even semitransparent glass ceramics are unsuitable, partially for cost reasons caused by the ceramicizing process.

Further demands on the substrate/superstrate material result from the structure of the solar cell and the temperature conditions during the process used for deposition of the CdTe film. With a view to achieving rapid deposition rates for good-quality CdTe, high temperatures, generally of over 650° C., are required. Accordingly, the substrate glasses should have a sufficiently high ability to withstand thermal loads, i.e. the transformation point $T_g$ of the glasses should be over 660° C. To prevent flaking of the semiconductor layer during the cooling which follows the coating process, the glasses must also be matched to the thermal expansion of CdTe ($\alpha_{20/300} \approx 5$–$6*10^{-6}$/K). In the case of the CIS technology, in addition to the high $T_g$ (>650° C.), a coefficient of thermal expansion $\alpha_{20/300}$ which is matched to the Mo layer functioning as electrode, of 4.5–5.0*$10^{-6}$/K, is required. The soda-lime glass which has previously been used in no way satisfies these requirements, having an $\alpha_{20/300} \approx 9*10^{-6}$/K and a $T_g$ of approx. 520° C.

Furthermore, the glasses are to be sufficiently mechanically stable and chemically resistant to water and also to any reagents used in the production process, in particular in the; case of the superstrate concept, in which there is no covering glass protecting the solar module from environmental influences. For example, soda-lime glasses only have a hydrolytic resistance belonging to Hydrolytic Class 3. Furthermore, it should be possible to economically produce the glasses in sufficient quality in terms of having no or few bubbles and crystalline inclusions.

Similar demands are also imposed on glasses for lamp bulbs:

The glasses have to be able to withstand high thermal loads, since high bulb temperatures generally occur in operation. The glasses must be sufficiently resistant to devitrification to be suitable for tube drawing. For use as lamp bulb glass for lamp bulbs which include molybdenum components as electrode or supply conductor material, the thermal expansion of the glasses has to be matched to that of molybdenum ($\alpha_{20/300}=5.0*10^{-6}$/K), so that a sealed, stress-free fusion between the metal and the glass is achieved. For this application too, the glasses must be as free from bubbles as possible. Moreover, glasses for halogen lamps must be substantially free of alkali metals, since alkali metal ions disrupt the regenerative halogen cycle of the lamp.

This profile of requirements is best satisfied by aluminoborosilicate glasses which contain alkaline earth metals but little if any alkali metal. However, the known glasses for display or solar cell substrates which are described in the following documents still have drawbacks in terms of their chemical and physical properties and/or their formation options and fail to satisfy the full range of demands.

Numerous documents describe glasses with relatively high $B_2O_3$ contents, for example DE 196 01 922 A, JP 58-120 535 A, JP 60-141 642 A, JP 8-295 530 A, JP 9-169 538 A, JP 10-59 741 A, JP 10-722 37 A, EP 714 862 A1, EP 341 313 B1, U.S. Pat. No. 5,374,595, DE 197 39 912 C1. These glasses do not have the required high transformation temperatures and/or have coefficients of expansion which are too low for the applications which are preferred in this document.

By contrast, $B_2O_3$-free glasses are described in U.S. Pat. No. 4,607,016, JP 61-236 631 A and JP 61-261 232 A. The absence of $B_2O_3$ means that the glasses are difficult to melt and tend towards devitrification. The glasses mentioned in WO 97/30001 also do not contain any $B_2O_3$.

DE 44 30 710 C1 describes borosilicate glasses with a low boric acid content and high $SiO_2$ contents (>75% by weight) which means that they are highly viscous even at high temperatures and can only be melted and refined at considerable cost. Moreover, these glasses, with transformation temperatures $T_g$ of between 500 and 600° C., have only a relatively low thermal stability.

DE 196 17 344 C1 and DE 196 03 698 C1, in the name of the applicant, have disclosed alkali-free, tin-containing glasses with a coefficient of thermal expansion $\alpha 20/300$ of approx. $3.7*10^{-6}/K$ and very good chemical stabilities. They are suitable for use in display technology. However, since they inevitably contain at least 1 to 2% by weight of the network modifier ZnO, they are not optimally suitable in particular for processing on a float installation.

The Pb-containing glasses which also have a relatively high Zn content ($\geq 3.5\%$ by weight) described in JP 61-295 256 A are also rather unsuitable for the float process, since, if the concentration is too high, it is easy for deposits of ZnO and PbO or Pb to form on the glass surface in the reducing forming-gas atmosphere as a result of evaporation followed by condensation.

Transparent glass ceramics, which are suitable, inter alia, for flat displays and solar cells, are described in JP 3-164445 A. The examples listed have high $T_g$ values of >780° C. and are well matched to CdTe in terms of their thermal expansion. However, on account of their very high zinc contents they are unsuitable for the float production process. The same applies to the transparent mullite-containing glass ceramics, which are doped with at most 1% by weight of chromium, from EP 168 189 A2 and the transparent garnet glass ceramics from JP 1-208343 A with possible applications in solar collectors. However, the high transparency required for use as superstrate in CdTe solar cell systems is not ensured either by glass ceramics, which, depending on the grain size of the crystallites, have a transmission which is lower than that of glasses, or by milky-white opal glasses as are described in FR 2126960.

JP 9-48632 A describes alkali-free aluminoborosilicate glasses which contain alkaline earth metals, with maximum alkaline earth metal oxide contents of 20% by weight. These glasses also have coefficients of thermal expansion which are too low for the applications preferred in this document. DE 196 80 966 T1 and DE 196 80 967 T1 describe alkali-free glass substrates which contain little or no MgO. Their glasses with preferred alkaline earth metal contents of at most 20% by weight also have an insufficiently high expansion.

By contrast, glasses which contain little or no alkali metal but have an excessively high expansion are known from WO 96/9259, JP 9-255354 A, JP 9-255355 A, JP 9-255 356 A and U.S. Pat. No. 5,741,746. The glasses described in WO 96/9259, with at least 45.5% by weight of RO (at least 25.5% by weight of BaO) have a high alkaline earth metal oxide content, as do those described in JP 9-255 354 A (BaO$\geq$8% by weight) and U.S. Pat. No. 5,741,746 (BaO$\geq$14% by weight), while the glasses described in JP 9-255 355 are low in $SiO_2$.

A substrate glass for applications in LCD and solar cell technology is described in U.S. Pat. No. 4,994,415. The glass, which does not contain any alkali metals or magnesium, includes high levels of BaO, at more than 10% by weight, and therefore ought to be highly resistant to devitrification. However, the density of the glass is high on account of this component. Similar statements are true of the BaO-rich glasses described in U.S. Pat. No. 5,326,730 (12–19 mol % of BaO).

If the BaO contents are too low, there is an increased tendency toward crystallization. This is true not only of the glasses described in WO 98/27019, which contain <3% by weight of SrO+BaO, but also, in particular, of the glasses described in EP 510 544 B1, which contain no barium and have a difference between the working temperature (temperature at the viscosity $10^4$ dPas) and the upper devitrification limit (liquidus temperature) which is unfavorable for the production process. JP 10-45422 A and JP 9-263 421 A describe glasses with alkaline earth metal contents of at most 20 or 22 mol %, respectively, and BaO contents of at most 1 mol %, preferably without any BaO, these glasses also having relatively low SrO contents. The glasses have very high temperatures at the viscosities $10^4$ dpas and 102 dPas, which places very high demands on the tank furnace and manifold material, so that the glasses cannot be produced at low cost. The glasses described in JP 4-175242 A also have relatively low SrO contents (1–9 mol %), but their BaO contents, which are likewise up to 9 mol %, are also rather high.

JP 10-25132 A describes glasses which are refined by means of a combined sulfate/chloride refining. The compositions vary over a wide range but include only at most 10% by weight of the component SrO, which is only optional as is the case for all alkaline earth metal oxides. Their $B_2O_3$ content is very high, at up to 20% by weight.

DE-A 1596 767 has already described aluminosilicate glasses for tungsten-iodine lamps which are substantially free of alkali metal oxides. The glasses have an alkaline earth metal oxide content of between 10 and 25% by weight, which can be combined as desired from MgO, CaO, SrO, BaO. According to the examples, it is composed of CaO and BaO and, if appropriate, MgO.

The glasses described in JP 1-126239 A may also vary considerably in terms of the content of the constituent CaO and the optional constituents SrO and BaO, the sum of these three components ranging from 12–25 mol %. The molar ratio between the sum of the said alkaline earth metal oxides, on the one hand, and this sum+$Al_2O_3$, on the other hand, is greater than 0.4 and less than 0.6.

On account of their high ratio of network-forming agents to alkaline earth metal oxides in combination with low $B_2O_3$ contents, the alkali-free glasses described in EP 0 528 149 B1 should be sufficiently thermally stable for high-temperature coating processes. With alkaline earth metal oxide contents of between 23 and 28 mol %, they encompass a range which can be used to achieve widely varying expansion coefficients. The dominant alkaline earth metal oxide is CaO, while MgO is not present or is present in only small amounts.

U.S. Pat. No. 5,116,789 and EP 0 527 320 B1 have disclosed MgO-free glasses, the dominant alkaline earth metal oxide in which is SrO (15–26 or 21–26 mol %, respectively) JP 9-12333 A has disclosed glasses for hard disk substrate which are rather low in SrO and high in CaO. The alkali-free aluminosilicate glasses for flat displays which are described in EP 672 629 A2 and U.S. Pat. No. 5,508,237 have similar maximum SrO contents. These documents show various composition ranges with different coefficients of thermal expansion. Allegedly, it is supposed to be possible to produce the glasses not only by the overflow-fusion drawing process but also by the float process, yet this is not possible using the refining agents $As_2O_3$ and $Sb_2O_3$ which are mentioned by way of example and the optional glass components $Ta_2O_5$ and $Nb_2O_5$, on account of the ease with which they can be reduced.

The sodium-containing glasses described in JP 4-83733 A comprise at least 80% by weight of $SiO_2$, $Al_2O_3$, $Na_2O$ and MgO. With this basic composition, it is not possible to achieve a thermal expansion of approx. $5-6*10^{-6}$/K with, at the same time, a high transformation temperature, or else it is possible to achieve this only by accepting drawbacks in terms of other properties.

It is an object of the invention to provide glasses which satisfy the abovementioned physical and chemical demands imposed on glass substrates for thin-film photovoltaic technologies based on compound semiconductors, in, particular based on the II–VI semiconductor CdTe or CIS, glasses which have a thermal stability which is sufficient for high-temperature deposition processes, i.e. a transformation temperature $T_g$ of at least 660° C., which have a working temperature range which is appropriate to the process and have a high devitrification stability and also a high quality with regard to the low level of bubbles and a chemical stability which at least matches that of soda-lime glasses.

This object is achieved by the aluminoborosilicate glasses which contain alkaline earth metals in accordance with claim 1.

The glasses contain balanced levels of the network-forming agents $SiO_2$ and $Al_2O_3$, with relatively small amounts of the network-forming agent $B_2O_3$. In this way, a high thermal stability of the glass combined with melting and working temperatures which remain low is achieved. To achieve the desired coefficient of thermal expansion ($\alpha_{20/300}$ between 4.5 and $6.0*10^{-6}$/K), the maximum content of $SiO2+Al_2O_3+B_2O_3$ is at most <80% by weight, preferably at most 74% by weight.

IN DETAIL

The glasses contain >49–65% by weight of $SiO_2$, preferably 50–64% by weight. Lower levels lead to a deterioration in the chemical stability, in particular the acid resistance, of the glass, while higher levels cause the thermal expansion to become excessively low. Moreover, in the latter case an increase in devitrification tendency is observed.

The glasses contain >10–23% by weight, preferably >10–22% by weight of $Al_2O_3$. A higher level has adverse effects on the process temperatures for hot-forming, while excessively low levels may make the glass more susceptible to crystallization.

The glasses contain 0.5–4.5% by weight of $B_2O_3$. The desired high transformation temperature is ensured by limiting the maximum $B_2O_3$ content. Furthermore, the low level of boric acid has positive effects on the chemical stability of the glass, in particular with respect to acids. However, it is not advisable to eliminate boric acid altogether, since it facilitates melting; even low levels of >0.5% by weight make their presence felt in a positive manner both in the melt flow and in the crystallization behavior.

The desired coefficient of thermal expansion $\alpha_{20/300}$ of between $4.5*10^{-6}$ and $6.0*10^{-6}$/K can be achieved with an alkaline earth metal oxide content of >20 to 35% by weight, preferably up to 32% by weight, particularly preferably of more than 26% by weight, by means of a multiplicity of combinations of the individual alkaline earth metal oxides. Glasses with low expansion coefficients ($\alpha_{20/300} \leq 5.0*10^{-6}$/K) tend to contain smaller amounts of alkaline earth metal oxides, preferably >20–28% by weight, while glasses with higher expansion coefficients $\alpha_{20/300}$ have relatively high alkaline earth metal oxide contents.

The respective levels of the individual alkaline earth metal oxides, and therefore their ratio to one another, are significant, since high levels of the light oxides MgO and. CaO would be advantageous with a view to achieving the lowest possible working temperature $V_A$ and a low density, but excessively high levels of these two oxides with relatively small cations, in particular of MgO, increases the likelihood of segregation, which has adverse effects on the spectral transmission and chemical stability of the glasses, and since high BaO contents increase the resistance to crystallization and thermal stability of the glasses, but result in glasses of undesirably high density, while SrO contents improve the resistance to crystallization and increase the transformation temperature without an excessively high rise in the density.

Consequently, it has proven optimal for SrO to be dominant, specifically for the glass to contain >2.7–7% by weight of MgO, 0.5–10% by weight of CaO, particularly preferably 0.5–9% by weight of CaO, >15.5–22% by weight of SrO, 0.5–7% by weight of BaO, particularly preferably at least 2.5% by weight of BaO, very particularly preferably at most <5% by weight of BaO.

The glasses may contain small amounts of alkali metal oxides, specifically up to 2% by weight of $Na_2O$ and up to 2% by weight of $K_2O$, with $Na_2O+K_2O=0-3\%$ by weight. These oxides improve the ease of melting. Furthermore, it has been found that, when using the CIS technology, the presence of small quantities of alkali metal oxides improves the efficiency of the solar cell. Higher levels of alkali metal oxides would cause the thermal expansion to increase excessively and would reduce the transformation temperature.

It is preferable for alkali metal oxides not to be added.

However, small amounts of $Na_2O$ and $K_2O$, i.e. in particular amounts of approx. one tenth of a percent by weight, as result from an alkali metal halide refining of the melt, can be present in the glasses for photovoltaic applications without there being any problems.

Particularly for use as lamp glasses, alkali metal halide refining is not used, and the glasses are free of alkali metal oxides apart from inevitable impurities.

On account of the high alkaline earth metal content (>20% by weight, preferably >26% by weight) and a maximum level of 7% by weight of MgO, the sum of the glass-forming agents $SiO_2$, $Al_2O_3$, the alkali metal oxide $Na_2O$ and MgO is relatively low. It may be at most 86.5% by weight, but is preferably kept to <80% by weight. This ensures that there are sufficient amounts of heavy alkaline earth metal oxides and that the desired properties with regard to thermal expansion and transformation temperature are simultaneously achieved.

On account of the high alkaline earth metal content, the ratio of the alkaline earth metal oxides to the sum of alkaline earth metal oxides and $Al_2O_3$ is relatively high. Its molar ratio is preferably more than 0.6.

The glass may contain up to 1% by weight of ZnO. Since its influence on the viscosity characteristic curve resembles that of boric acid, ZnO on the one hand has the effect of loosening the network, but on the other hand does not increase the thermal expansion to the same degree as the alkaline earth metal oxides. Particularly when the glasses are processed in the float process, the ZnO content is preferably limited to relatively small amounts ($\leq 0.5\%$ by weight), or ZnO is dispensed with altogether. Amounts of greater than 0.5% by weight increase the risk of disruptive ZnO deposits on the glass surface. These may form through evaporation and subsequent condensation in the hot-forming area.

The glass may contain up to 2% by weight, preferably up to 1.5% by weight of $ZrO_2$. $ZrO_2$ increases the thermal stability of the glass. However, levels or more than 2% by weight may lead to the formation of melting residues in the glass, on account of the difficulty of dissolving $ZrO_2$. It is preferable for at least 0.1% by weight of $ZrO_2$ to be present.

The glass may contain up to 2% by weight, preferably up to 1.5% by weight of $TiO_2$. TiO2 reduces the tendency of the glasses toward solarization. Levels or more than 2% by weight may cause discolorations on account of the formation of complexes with $Fe^{3+}$ ions. It is preferable for at least 0.1% by weight of $TiO_2$ to be present. The glass may contain up to 2% by weight, preferably up to 1.5% by weight, of $SnO_2$. $SnO_2$ is a highly effective refining agent in particular in high-melting, alkali-free aluminoborosilicate glass systems which contain alkaline earth metals. The tin oxide is used as $SnO_2$, and its tetravalent state is stabilized by the addition of other oxides, such as for example $TiO_2$, or by the addition of nitrates. Since it is difficult to dissolve at temperatures below the working temperature $V_A$, the amount of $SnO_2$ is restricted to the upper limit given above. This avoids precipitation of microcrystalline Sn-containing phases. It is preferable for at least 0.1% by weight of $SnO_2$ to be present.

The glass may also contain up to 1.5% by weight, preferably up to 1.0% by weight of $CeO_2$. It is preferable for there to be at least 0.1% by weight of $CeO_2$. The combination of $SnO_2$ with $CeO_2$ stabilizes the $SnO_2/SnO$ redox equilibrium, and the very good refining action of the $SnO_2$ is improved still further. However, $CeO_2$ is also highly effective as the sole refining agent in high-melting glasses. The $CeO_2$ content is preferably limited to at most 0.5% by weight.

Glasses which melt at relatively low temperatures can also be refined using alkali metal halides. For example, sodium chloride contributes to refining on account of its evaporation at over approx. 1410° C., some of the NaCl used making its presence felt again as $Na_2O$ in the glass. If 1.5% by weight of NaCl is added, approx. 0.1% by weight of $Cl^-$ remains in the glass.

The alkali metal ions which are present in the glass do not have an adverse effect on the semiconductor layer comprising the compound semiconductors CdTe and CIS.

The glasses can be processed to form flat glasses using the various drawing processes, e.g. microsheet-down-draw, up-draw or overflow-fusion processes.

The glass may contain up to 1.5% by weight of $As_2O_3$ and/or $Sb_2O_3$ as additional or sole refining agent(s). It is also possible to add in each case 1.5% by weight of $Cl^-$ (for example as $BaCl_2$ or NaCl), $F^-$ (e.g. as $CaF_2$ or NaF) or $SO_4^{2-}$ (e.g. as $BaSO_4$). However, the sum of $As_2O_3$, $Sb_2O_3$, $Cl^-$, $F^-$ and $SO_4^{2-}$ should not exceed 1.5% by weight. If the refining agents $As_2O_3$ and $Sb_2O_3$ are not present, the glass can also be processed using the float process.

EXEMPLARY EMBODIMENTS

Glasses were melted from conventional raw materials at 1560° C. in Pt/Ir crucibles. The melt was refined for one hour at this temperature and was then transferred into inductively heated platinum crucibles and agitated for 30 minutes at 1540° C. for homogenization.

The table shows six examples of glasses according to the invention, giving their compositions (in % by weight based on oxide) and their most important properties, including:

the density $\rho$ {g/cm$^3$} the coefficient of thermal expansion $\alpha_{20/300}$ [$10^{-6}$/K]

the dilatometric transformation temperature $T_g$ [° C.] in accordance with DIN 52324 the temperature at the viscosity $10^2$ dPas (given as T 2 [° C.]), calculated from the Vogel-Fulcher-Tamman equation the temperature at the viscosity $10^4$ dPas (denoted as T 4 [° C.])

the temperature at viscosity $10^{7.6}$ dPas (denoted as T 7.6 [° C.])

the temperature at viscosity $10^{13}$ dPas (denoted as T 13 [° C.])

the temperature at viscosity $10^{14.5}$ dPas (denoted as T 14.5 [° C.]), calculated from the Vogel-Fulcher-Tammann equation the hydrolytic stability in accordance with DIN ISO 719 "H" [$\mu$g $Na_2O$/g]. With a base equivalent as $Na_2O$ per g of glass grit of $\leq 31$ $\mu$g/g, the glasses belong to Hydrolytic Class 1 ("chemically highly resistant glass")

the acid resistance in accordance with DIN 12166 "S" [mg/dm$^2$]. With a weight loss of over 0.7 to 1.5 mg/dm$^2$, the glasses belong to Acid Class 2, and with a weight loss of over 1.5 to 15 mg/dm$^2$ the glasses belong to Acid Class 3 the lye resistance in accordance with ISO 695 "L" [mg/dm$^2$]. With a weight loss of over 75 to 175 mg/dm$^2$, the glasses belong to Lye Class 2 the maximum transmission at wavelengths of between 400 and 850 nm (specimen thickness 2.5 mm) $\tau_{max}$ (400–850 nm)

the upper devitrification limit OEG [° C.], i.e., the liquidus temperature the maximum crystal growth rate $V_{max}$ [$\mu$m/h]

TABLE

Compositions (in % by weight based on oxide) and significant properties of glasses according to the invention.

|  | 1 | 2 | 3 | 4 | 5 | 6 |
|---|---|---|---|---|---|---|
| $SiO_2$ | 58.8 | 52.3 | 52.5 | 50.8 | 58.8 | 51.0 |
| $B_2O_3$ | 1.0 | 2.9 | 1.1 | 4.0 | 1.0 | 0.5 |
| $Al_2O_3$ | 10.5 | 16.5 | 14.0 | 12.8 | 10.5 | 20.0 |
| MgO | 5.0 | 2.8 | 4.0 | 6.0 | 4.2 | 3.5 |
| CaO | 5.0 | 5.3 | 4.0 | 1.0 | 5.0 | 3.7 |
| SrO | 16.0 | 17.0 | 16.0 | 20.0 | 16.0 | 16.0 |
| BaO | 3.0 | 2.5 | 7.0 | 5.0 | 3.0 | 4.0 |

TABLE-continued

Compositions (in % by weight based on oxide) and
significant properties of glasses according to the invention.

| | 1 | 2 | 3 | 4 | 5 | 6 |
|---|---|---|---|---|---|---|
| $ZrO_2$ | 0.5 | 0.3 | 1.4 | 0.2 | 0.5 | 0.3 |
| $SnO_2$ | 0.2 | 0.4 | — | 0.2 | — | — |
| $Na_2O$ | — | — | — | — | 1.0 | — |
| $K_2O$ | — | — | — | — | — | 1.0 |
| $\rho$ [g/cm$^3$] | 2.810 | 2.813 | 2.896 | 2.883 | 2.790 | 2.830 |
| $\alpha_{20/300}$ [$10^{-6}$/K$^{-1}$] | 5.34 | 5.20 | 5.39 | 5.45 | 5.75 | 5.40 |
| Tg [° C.] | 728 | 735 | 740 | 706 | 689 | 748 |
| T 14.5 [° C.] | 703 | 708 | n.d. | n.d. | n.d. | n.d. |
| T 13 [° C.] | 734 | 739 | n.d. | n.d. | 734 | n.d. |
| T 7.6 [° C.] | 919 | 925 | n.d. | n.d. | 896 | n.d. |
| T 4 [° C.] | 1206 | 1210 | 1207 | 1157 | 1178 | 1251 |
| T 2 [° C.] | 1549 | 1549 | n.d. | 1495 | 1585 | 1598 |
| H [µg Na$_2$O/g] | 18 | 13 | n.d. | n.d. | 18 | n.d. |
| S [mg/dm$^2$] | 1.5 | n.d. | n.d. | n.d. | n.d. | n.d. |
| L [mg/dm$^2$] | 91 | n.d. | n.d. | n.d. | n.d. | n.d. |
| $\tau_{max}$ (400–850 nm) | 90.0 | 90.2 | n.d. | n.d. | 90.5. | n.d. |
| OEG [° C.] | 1200 | n.d. | n.d. | n.d. | 1140 | n.d. |
| $V_{max}$ | 17 | n.d. | n.d. | n.d. | 22 | n.d. | n.d. = not determined

As the exemplary embodiments illustrate, the glasses according to the invention have the following advantageous properties:

A thermal expansion $\alpha_{20/300}$ of between $4.5*10^{-6}$/K and $6.0*10^{-6}$/K, therefore matched to the expansion behavior of CdTe or to the Mo layer which is applied as electrode in the CIS technology.

With $T_g>660°$ C., a very high transformation temperature. This is of essential importance for the shrinkage (compaction) caused by production to be as low as possible and for the glasses to be used as substrates in high-temperature deposition processes. The high transformation temperature explains the high ability of the glasses to withstand thermal loads.

A temperature at viscosity $10^4$ dPas of at most 1300° C., which indicates a working range which is appropriate to the process, and good resistance to devitrification. These two properties enable the glass to be produced as flat glass using the various drawing processes, e.g. microsheet-down-draw, up-draw or overflow-fusion processes, and, in a preferred embodiment, if it is free of $As_2O_3$ and $Sb_2O_3$, also using the float process.

A very high hydrolytic stability.

Furthermore, the glasses have a high resistance to solarization, a high transparency ($\geq 90\%$ $\tau_{max}$ (400–850 nm; 2.5 mm)) and a high quality in terms of having few if any bubbles.

Consequently, the glasses are eminently suitable for use as substrate glass in thin-film photovoltaics, especially based on compound semiconductors, in particular based on CdTe and on Cu(In,Ga) (Se,S)$_2$ (CIS).

Glasses with coefficients of thermal expansion $\alpha_{20/300}$ of between 4.5 and $5.0*10^{-6}$/K are used for the CIS technology. In terms of their expansion behavior, they are matched to that of the Mo layers used as electrode. Glasses whose thermal expansion is matched to that of CdTe, i.e. which have an $\alpha_{20/300}$ of between 5.0 and $6.0*10^{-6}$/K, are used for solar cells based on CdTe. The specific a values can be achieved by varying the RO content.

Glasses with transformation temperatures $T_g$ of >715° C. and with coefficients of thermal expansion $\alpha_{20/300}$ of between 4.5 and $5.0*10^{-6}$/K are eminently suitable for use as glasses which are to be fused to Mo, since their thermal expansion is matched to that of molybdenum and they have a very high ability to withstand thermal loads, and if they are free of alkali metals, they are also eminently suitable as bulb glass for lamp bulbs which have Mo components, in particular for those which have bulb temperatures of approx. 550–640° C.

What is claimed is:

1. An aluminoborosilicate glass which contains alkaline earth metals which has the following composition (in % by weight, based on oxide):

| | |
|---|---|
| $SiO_2$ | >49–65 |
| $B_2O_3$ | 0.5–4.5 |
| $Al_2O_3$ | >10–23 |
| MgO | >2.7–7 |
| CaO | 0.5–10 |
| SrO | >15–22 |
| BaO | 0.5–7 |
| with MgO + CaO + SrO + BaO | >20–35 |
| $SnO_2$ | 0–2 |
| $ZrO_2$ | 0–2 |
| $TiO_2$ | 0–2 |
| $CeO_2$ | 0–1.5 |
| ZnO | 0–1 |
| $Na_2O$ | 0–2 |
| $K_2O$ | 0–2 |
| with $Na_2O + K_2O$ | 0–3. |

2. An aluminoborosilicate glass as claimed in claim 1, wherein said glass has the following composition (in % by weight, based on oxide):

| | |
|---|---|
| $SiO_2$ | 50–64 |
| $B_2O_3$ | 0.5–4.5 |
| $Al_2O_3$ | >10–22 |
| MgO | >2.7–7 |
| CaO | 0.5–10 |
| SrO | >15–22 |
| BaO | 0.5–7 |
| with MgO + Cao + SrO + BaO | >20–32 |

-continued

| | |
|---|---|
| SnO$_2$ | 0–1.5 |
| ZrO$_2$ | 0–1.5 |
| TiO$_2$ | 0–1.5 |
| CeO$_2$ | 0–1 |
| ZnO | 0–1 |
| Na$_2$O | 0–2 |
| K$_2$O | 0–2 |
| with Na$_2$O + K$_2$O | 0–3. |

3. The aluminoborosilicate glass which contains alkaline earth metals as claimed in claim 1, containing at least 2.5% by weight of BaO.

4. An aluminoborosilicate glass as claimed in claim 1, wherein said glass contains >26% by weight of MgO+CaO+SrO+BaO.

5. An aluminoborosilicate glass as claimed in claim 1, wherein said glass contains at least 0.1% by weight of ZrO$_2$.

6. An aluminoborosilicate glass as claimed in claim 1, wherein said glass contains at least 0.1% by weight of SnO$_2$.

7. An aluminoborosilicate glass as claimed in claim 1, wherein said glass contains at least 0.1% by weight of CeO$_2$.

8. An aluminoborosilicate glass as claimed in claim 1, wherein said glass contains at least 0.1% by weight of TiO$_2$.

9. An aluminoborosilicate glass as claimed in claim 1, wherein said glass additionally contains:

| | |
|---|---|
| As$_2$O$_3$ | 0–1.5 |
| Sb$_2$O$_3$ | 0–1.5 |
| Cl$^-$ | 0–1.5 |
| F$^-$ | 0–1.5 |
| SO$_4^{2-}$ | 0–1.5 |
| with As$_2$O$_3$ + Sb$_2$O$_3$ + Cl$^-$+ F$^-$+ SO$_4^{2-}$ | ≦1.5. |

10. An aluminoborosilicate glass as claimed in claim 1, wherein said glass is free of alkali metal oxides, apart from residues of refining agent.

11. An aluminoborosilicate glass as claimed in claim 1, wherein said glass has a coefficient of thermal expansion $\alpha_{20,300}$ of between $4.5*10^{-6}$/K and $6.0*10^{-6}$/K and a transformation temperature $T_g$ of >660° C.

12. In a thin film photovoltaic device comprising a photovoltaic thin film and substrate glass, the improvement wherein said substrate glass comprises an aluminoborosilicate glass as claimed in claim 1.

13. In a lamp comprising a bulb glass containing a lighting element, the improvement wherein said bulb glass comprises an alkali-free aluminoborosilicate glass as claimed in claim 1 having a coefficient of thermal expansion $\alpha_{20/300}$ of between $4.5*10^{-6}$/K and $5.0*10^{-6}$/K and a transformation temperature $T_g$ of >715° C.

14. An aluminoborosilicate glass as claimed in claim 2, wherein said glass contains at least 2.5% by weight of BaO.

15. An aluminoborosilicate glass as claimed in claim 14, wherein said glass contains >26% by weight of MgO+CaO+SrO+BaO.

16. An aluminoborosilicate glass as claimed in claim 15, wherein said glass contains at least 0.1% by weight of ZrO$_2$.

17. An aluminoborosilicate glass as claimed in claim 16, wherein said glass contains at least 0.1% by weight of SnO$_2$.

18. An aluminoborosilicate glass as claimed in claim 17, wherein said glass contains at least 0.1% by weight of CeO$_2$.

19. An aluminoborosilicate glass as claimed in claim 18, wherein said glass is free of alkali metal oxides, apart from residues of refining agent.

20. An aluminoborosilicate glass as claimed in claim 19, wherein said glass has a coefficient of thermal expansion $\alpha_{20/300}$ of between $4.5*10^{-6}$/K and $6.0*10^{-6}$/K and a transformation temperature $T_g$ of >660° C.

21. An aluminoborosilicate glass as claimed in claim 1, wherein said glass contains 0.5–9% by weight CaO.

22. An aluminoborosilicate glass as claimed in claim 1, wherein said glass contains at most <5% by weight BaO.

23. An aluminoborosilicate glass as claimed in claim 1, wherein said glass contains <80% by weight of SiO$_2$+Al$_2$O$_3$+Na$_2$O+MgO.

24. An aluminoborosilicate glass as claimed in claim 1, wherein said glass contains at most <5% by weight ZnO.

25. An aluminoborosilicate glass as claimed in claim 1, wherein said glass contains at most 2.5–5% by weight BaO.

* * * * *

UNITED STATES PATENT AND TRADEMARK OFFICE
CERTIFICATE OF CORRECTION

PATENT NO. : 6,680,266 B1  Page 1 of 1
DATED : January 20, 2004
INVENTOR(S) : Ulrich Peuchert et al.

It is certified that error appears in the above-identified patent and that said Letters Patent is hereby corrected as shown below:

<u>Title page,</u>
Item [57], ABSTRACT,
Line 6, delete second "$ZrO_2$ 0-2;"

<u>Column 11,</u>
Line 40, "$\alpha_{20,300}$" should read -- $\alpha_{20/300}$ --

Signed and Sealed this

Nineteenth Day of October, 2004

JON W. DUDAS
*Director of the United States Patent and Trademark Office*